United States Patent [19]

Castner

[11] 4,271,471
[45] Jun. 2, 1981

[54] METHOD OF OPERATING A REMOTELY CONTROLLED TOOL POSITIONING TABLE

[75] Inventor: Raymond P. Castner, Monroeville, Pa.

[73] Assignee: Westinghouse Electric Corp., Pittsburgh, Pa.

[21] Appl. No.: 974,159

[22] Filed: Dec. 28, 1978

[51] Int. Cl.³ .................... G05D 3/00; B65G 47/96
[52] U.S. Cl. ................................ 364/474; 165/76; 364/513; 414/728; 414/744 R
[58] Field of Search ............... 29/157.4, DIG. 19, 26, 29/43, 51; 165/76, 79; 414/730, 744, 749, 756, 728; 364/474, 478, 513; 408/1

[56] References Cited

U.S. PATENT DOCUMENTS

| 3,913,752 | 10/1975 | Ward et al. .................... 414/750 |
| 4,004,698 | 1/1977 | Gebelin ......................... 165/76 X |
| 4,074,814 | 2/1978 | Cooper et al. ................. 165/76 X |
| 4,164,810 | 8/1979 | Sipek et al. ................... 414/730 X |
| 4,188,167 | 2/1980 | Abell ............................ 165/76 X |

Primary Examiner—Felix D. Gruber
Attorney, Agent, or Firm—D. C. Abeles; Z. L. Dermer

[57] ABSTRACT

A steam generator tubesheet is serviced by end effectors mounted on a slew table cantilevered from a carriage slidable along an arm rotatable in a plane parallel to the tubesheet. In servicing a selected hole in the tubesheet, the rotatable arm and the carriage arm are driven to positions which allow the cantilevered slew table to be slewed to a predetermined angle associated with the selected hole. The arm and carriage are then driven to positions which place the end effector under the selected hole taking into account the offset of the slew table. Alternatively, a determination is first made whether the arm and carriage can be positioned within preset limits to place the end effector under the selected hole using the existing slew angle. If so, the existing slewed angle is used but, if not, the table is slewed as mentioned above.

8 Claims, 8 Drawing Figures

METHOD OF OPERATING A REMOTELY CONTROLLED TOOL POSITIONING TABLE

CROSS-REFERENCE TO RELATED APPLICATIONS

Commonly owned U.S. application Ser. No. 896,530 filed on Apr. 14, 1978 in the name of Kenneth S. Gerkey and entitled "Remotely Controlled Tool Positioning Table", now U.S. Pat. No. 4,200,424.

BACKGROUND OF THE INVENTION

1. Field of the Invention

This invention relates to a method of servicing a nuclear steam generator and, more particularly, to a method of operating a cantilevered tool support table rotatably mounted on a carriage slidable along an arm rotatable in a plane parallel to the tubesheet of such a steam generator.

2. Prior Art

Commonly owned copending patent application Ser. No. 952,431 filed on Oct. 18, 1978 in the names of Frank Cooper and Raymond Castner and entitled "Method and Apparatus for Servicing a Steam Generator," describes the servicing of a steam generator using tools mounted on a carriage movable along an arm which in turn is rotatable in a plane parallel to the tubesheet of a nuclear steam generator. By appropriate adjustment of the angular position of the arm and the longitudinal position of the carriage along the arm, the tool can be sequentially positioned to perform a selected operation on successive holes in the tubesheet. However, due to the hemispherical shape of the channel head adjacent the tubesheet, the semicircular configuration of the array of holes therein and the limitation placed on the length of the arm by the means in which it is mounted in the channel head, it is not possible to directly position the carriage carrying the selected tool under each hole in the tubesheet. In order to reach the holes which are inaccessible with the carriage alone, a cantilevered tool arm is mounted on the carriage. The cantilevered tool arm is manually rotatable to about 6 angular positions so that both the holes beyond the outer and inner limits of carriage travel can be reached. More than just a radially outward and inward extension is required, however, because the pivot point of the rotatable arm as mounted in the channel head is not located on the diameter of the semicircular hole array. In fact, it is not only necessary to adjust the angular position of the cantilevered tool arm, but tool arms of 3 or 4 different lengths must be used to reach all the holes.

In order to change the angular position of the cantilevered tool arm or substitute one of a different length, it is necessary to pivot the rotatable arm out of the plane of the tubesheet to align it with a manway where the adjustment can be made manually. Each such adjustment exposes the operator to radiation in the channel head and it therefore is desirable to minimize the number of such manual adjustments required. Unfortunately, during the retubing operation the tubes must be installed along the columns which run perpendicular to the channel head divider plate, thereby necessitating an adjustment in the cantilevered platform at the end of each column. Since a typical tubesheet has 114 columns of holes, the large number of adjustments required to retube the generator takes excessive time to accomplish and exposes the operator to radiation for an appreciable accumulated period of time.

SUMMARY OF THE INVENTION

According to the invention, the tubesheet of a steam generator is serviced by an end effector mounted on the free end of a rotatable slew table cantilevered from a carriage movable along an arm which in turn is rotatable in a plane parallel to the tubesheet. A determination is made of the angle that the cantilevered slew table must make in order for the end effector to be positioned under a selected hole in the tubesheet. The rotatable arm and the carriage are driven to a slewing area where the cantilevered slew table can be slewed without interference and the slew table is slewed to the previously determined position. Then the rotatable arm and the carriage are driven to the respective positions which place the end effector under the selected hole, taking into account the offset of the cantilevered slew table.

The angle at which the cantilevered slew table is set can be determined by retrieving a previously selected angular position from a storage medium which stores a preferred angular position of the cantilevered slew table for each hole in the array. Alternatively, the angle can be selected by determining the position of the arm and the carriage required to locate the end effector under the selected hole using the existing angular position of the cantilevered slew table and comparing these positions with previously determined limits therefor. If the positions of the arm and carriage determined in this manner are within the preset limits, then the existing position of the cantilevered slew table is used. If not, another angular position of the cantilevered slew table is selected such as by retrieving the preferred position from the storage medium. Of course, it is not necessary to drive the rotatable arm and carriage to the slewing area if the existing position of the cantilevered platform is to be used, which understandably speeds up the procedure.

DESCRIPTION OF THE PREFERRED EMBODIMENT

Figure 1:
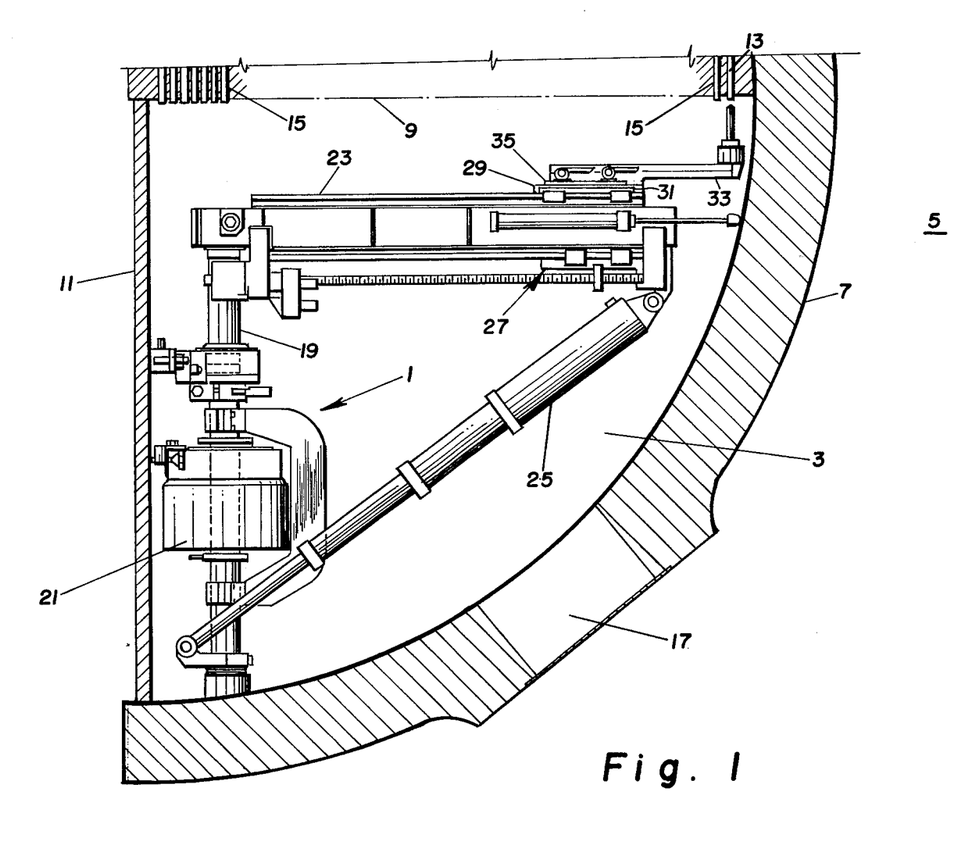
FIG. 1 is a partial vertical sectional view through a nuclear steam generator illustrating servicing apparatus incorporating the invention in place in the channel head.

The invention will be described as applied to the steam generator servicing apparatus 1 shown in FIG. 1. Detailed explanations of this apparatus and its operation are set forth in commonly owned applications Ser. No. 888,701 filed on Mar. 21, 1978 now U.S. Pat. No. 4,205,940 and Ser. No. 952,431 filed on Oct. 18, 1978. However, for the purpose of gaining an understanding of the present invention, FIG. 1 illustrates one-half of the channel head 3 formed on the lower end of a nuclear steam generator 5 by the hemispherical shell 7 and the tubesheet 9. The channel head 3 is divided into an inlet side and an outlet side (only one shown) by a vertical divider plate 11. The opposite ends of thousands of U-shaped tubes 13 communicate with the inlet and outlet sections of the channel head through holes 15 in the tubesheet. The channel head 3 and U-shaped tubes 13 form the primary side of the heat exchanger with primary coolant from the nuclear reactor entering the inlet side of the channel head 3 through an inlet (not shown), circulating through the U-shaped tubes and exiting the outlet side through an outlet (not shown). Water circulating around the U-shaped tubes in the secondary side of the heat exchanger above the tubesheet 9 is converted into steam by heat given up by the primary coolant.

Periodically it is necessary to service the tubing in the steam generator and for this purpose an apparatus 1 is inserted into each side of the channel head 3 through a manway 17. The servicing apparatus comprises a column 19 which is rotatable about a vertical axis by a motor 21. An arm 23 is pivotally connected at one end to the top of the vertical column 19 and is supported at the other end by a pair (only one shown) of hydraulic cylinders 25 connected between the arm and the lower end of the column 19. In the operative position as illustrated in FIG. 1, the arm 23 is supported in a horizontal position and is rotated in a plane just below and parallel to the tubesheet as the column 19 is rotated by the motor 21.

A carriage 27, mounted for longitudinal movement along the arm 23, is provided with a platform 29 vertically extendable above a base plate 31. By appropriate coordination of the rotation of the arm 23 and the movement of the carriage 27 along the arm, a tool carried by the carriage can be positioned under a selected hole in the tubesheet 9 and raised into operative position by the platform 29, all as fully explained in the above mentioned copending applications. However, as is evident from FIG. 1, and as will become more evident from the description below of FIG. 4, a tool mounted directly on the platform 29 cannot reach all of the holes 15 in the tubesheet 9 due to the limits of travel of the carriage 27 and the configuration of the hole array. In order to reach the portions of the tubesheet beyond the limits of travel of the carriage 27, a cantilevered tool support arm 33 is mechanically clamped onto the carriage. By mounting the tool support arm 33 so that it extends radially outward from the vertical column 19, holes 15 near the circular portion of the periphery of the hole array can be reached by the tool. However, for reaching the holes adjacent the divider plate 11 which are behind the vertical axis about which the arm 23 is pivoted, the tool arm must be turned around so that it can be directed radially inward. As is explained below, it is also necessary to position the tool support arm 33 at several intermediate angular positions in order to reach all the holes in the array. In order to make these changes in the apparatus described in application Ser. No. 952,431, the arm 23 must be rotated in a horizontal plane by motor 21 and then in a vertical plane by hydraulic cylinders 25 to align the end of the arm with the manway 17 where the adjustments in the angular position of the tool support arm 33 can be made.

Copending application Ser. No. 896,530 describes the mechanical features of a carriage 27 having a remotely rotatable plate 35 mounted on the vertically movable platform 29 so that the tool support arm 33 which is cantilevered from the rotatable plate 35 may be automatically positioned at any one of a number of angular positions relative to the longitudinal axis of the carriage 27. The present invention relates to a method of operating the apparatus therein described.

Figure 2:
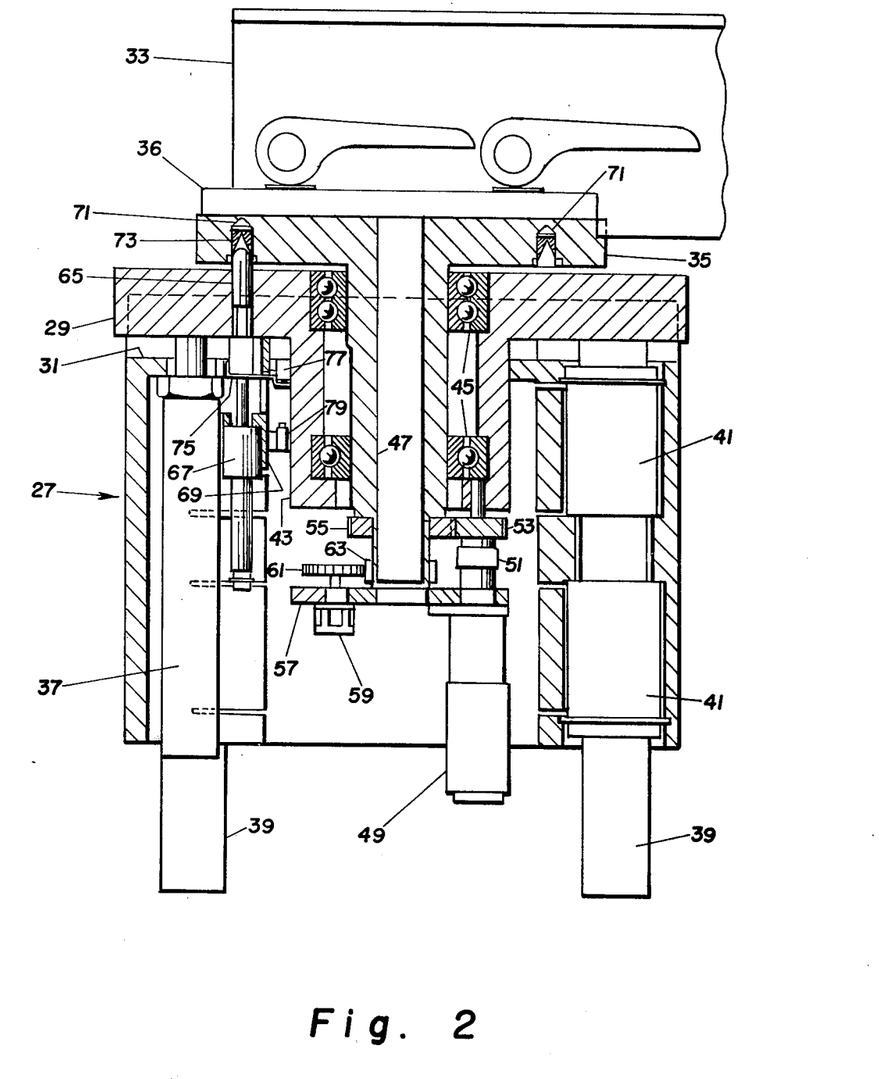
FIG. 2 is a partial vertical sectional view through a carriage which is part of the servicing apparatus shown in FIG. 1.
Figure 3:
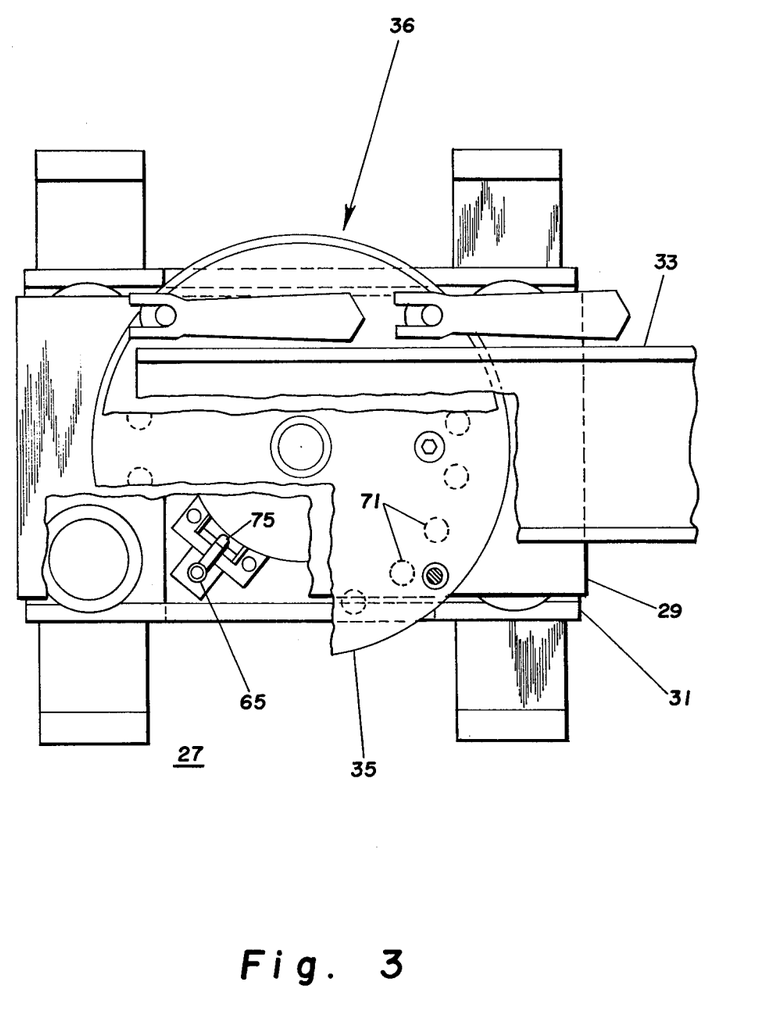
FIG. 3 is a top plan view of FIG. 2 with some parts cut away.

As shown in FIGS. 2 and 3, the platform 29 is raised and lowered relative to the base plate 31 of the carriage 27 by a pair of hydraulic cylinders 37 (only one shown). The platform is precisely guided in its vertical travel by four columns 39 (only two shown) supported at each corner of the carriage 27 by upper and lower bearings 41. The platform 29 is provided with a centrally disposed depending cylindrical extension 43. Upper and lower bearings 45 mounted in the extension 43 rotatably support the rotatable plate 35 through a tubular extension 47 thereon. The plate 35 is rotated by an air, hydraulic or electrically driven motor 49 through a coupling 51 welded to the side of a gear 53 journalled in the platform extension 43. This gear in turn meshes with a gear 55 mounted on the tubular extension 47 on the plate. The motor is supported by a support plate 57 suspended from the lower end of platform extension 43 by a pair of rods (not shown). The support plate 57 also provides a mount for a slew position feedback sensor 59 which is connected to the tubular extension 47 by gears 61 and 63. The feedback sensor is a precision potentiometer which is used to generate an electrical signal representative of the angular position of the plate 35 relative to the platform 29.

The rotatable plate 35 may be secured in a number of preselected angular positions relative to the platform 29 by a tapered shot pin 65 which is extended and retracted by an air driven cylinder 67 mounted on the underside of the platform 29 by a support bracket 69. The pin 65 projects, when extended, into a vertical bore 71 in the underside of the plate 35 which is fitted with a tapered bushing 73 that seats on the pin 65 to accurately and rigidly fix the angular position of the plate 35. It is important that the plate 35 be positioned rigidly and accurately in order to assure that very tight tolerances are maintained by tools mounted on the end of tool arm 33 cantilevered from the plate 35. A number of bores 71 are provided in the plate 35 to permit flexbility in positioning the tool arm. In the embodiment of the invention disclosed, the bores 71 are spaced 20° apart providing eighteen angular positions for the cantilevered slew table 36 formed by the plate 35 and tool support arm 33.

A trip arm 75 adjustably mounted on the plunger of the shot pin 65, energizes microswitches 77 and 79 to indicate that the pin is fully seated or retracted respectively. The signals generated by these switches are used in the control of the system as described below.

The tool support arm 33 is releasably attached to the rotatable plate 35 by means, not shown but of well known construction, such as "Expando Grip" pins (trademark). When it is desired to change the tool arm, the arm 23 and carriage 27 are positioned to present the tool arm at the manway 17 as described above. Various tools may be mounted on the tool support arm including: a drill and spot-face tool which drills out holes and spot-faces them in preparation for tubing or retubing of the generator, a tube guide extractor which removes a device inserted in the end of each tube to guide it through the supports and into the proper hole in the tubesheet, a tube expander which aligns the end of the tube flush with the spot-face surface and expands it within the tubesheet hole, a welding tool, a brush and a TV camera.

Figure 4:
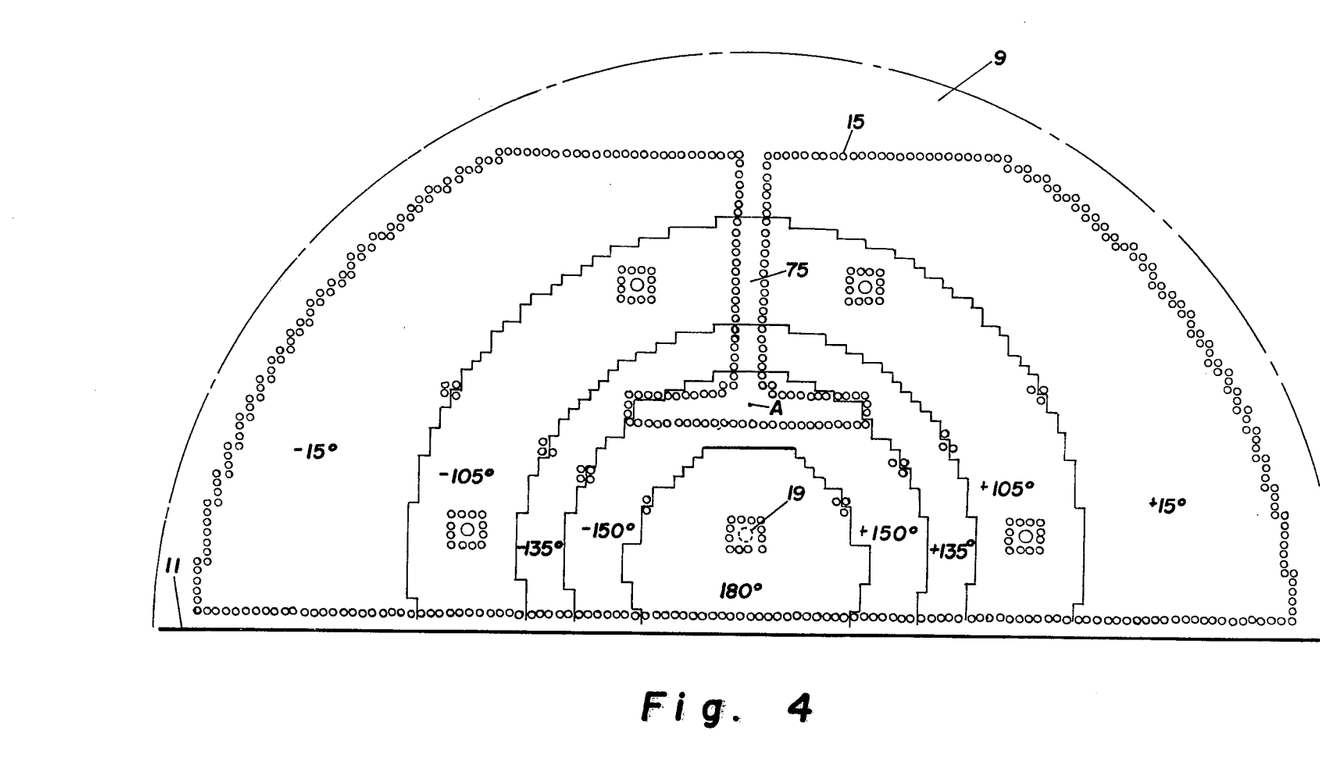
FIG. 4 is a plan view of the tubesheet of the steam generator shown in FIG. 1 illustrating the hole array.

FIG. 4 illustrates the semicircular array of holes in one-half of a typical tubesheet although only peripheral holes are shown for the sake of clarity. Each hole is identified as belonging to a row which extends horizontal to, and a column which extends vertically from, the divider plate 11. In a typical generator, there are 49 rows numbered from the divider plate out and 114 columns numbered from right to left as viewed in the figure. In the array shown, the holes in an inverted T-shaped area 75 are missing to accommodate for the arrangement of other equipment on the secondary side of the tubesheet. As also shown, the servicing machine is placed in the channel head with the vertical column 19 aligned with the 7th row between the 57th and 58th columns. By reference to FIGS. 1 and 4, it should be evident that a tool placed directly at the center of the carriage 27 cannot reach all of the holes in the array. First, since the center of rotation of the machine is displaced 7 rows from the bottom of the array, the holes in a sector between the column 19 and the divider plate 11 cannot be reached. Also, since the arm 23 must be short enough to clear the shell 7 at row 49 between columns 57 and 58, the arc that its extremely circumscribes does not reach beyond columns 15 or 99 on row 7 and falls even shorter for the lower numbered rows.

Since the manually rotatable table had only six angular positions at which the tool arm could be set relative to the carriage, it was necessary to have three different tool arms of varying length in order to reach all of the holes. Thus, it was not only necessary to change the angle of the tool arm as mounted on the carriage, it was necessary to also change tool arms at times to utilize the different length arms. As discussed previously, each time a change was required, the arm 23 had to be aligned in a horizontal plane and then lowered in a vertical plane while the carriage 27 was driven to the outer extremity of the arm so that the tool arm mount was accessible from the manway 17. This was particularly burdensome during retubing since the tubes are installed along columns which required a change in angle and/or tool arm length twice for each column.

With the remote indexing of the tool arm provided by this invention, it is not necessary to align the tool arm with the manway 17 in order to change angles. Also, with the increased number of secure angular positions for the tool arm, only one tool arm of one selected length is required to reach all of the holes for a given operation.

Figure 5:
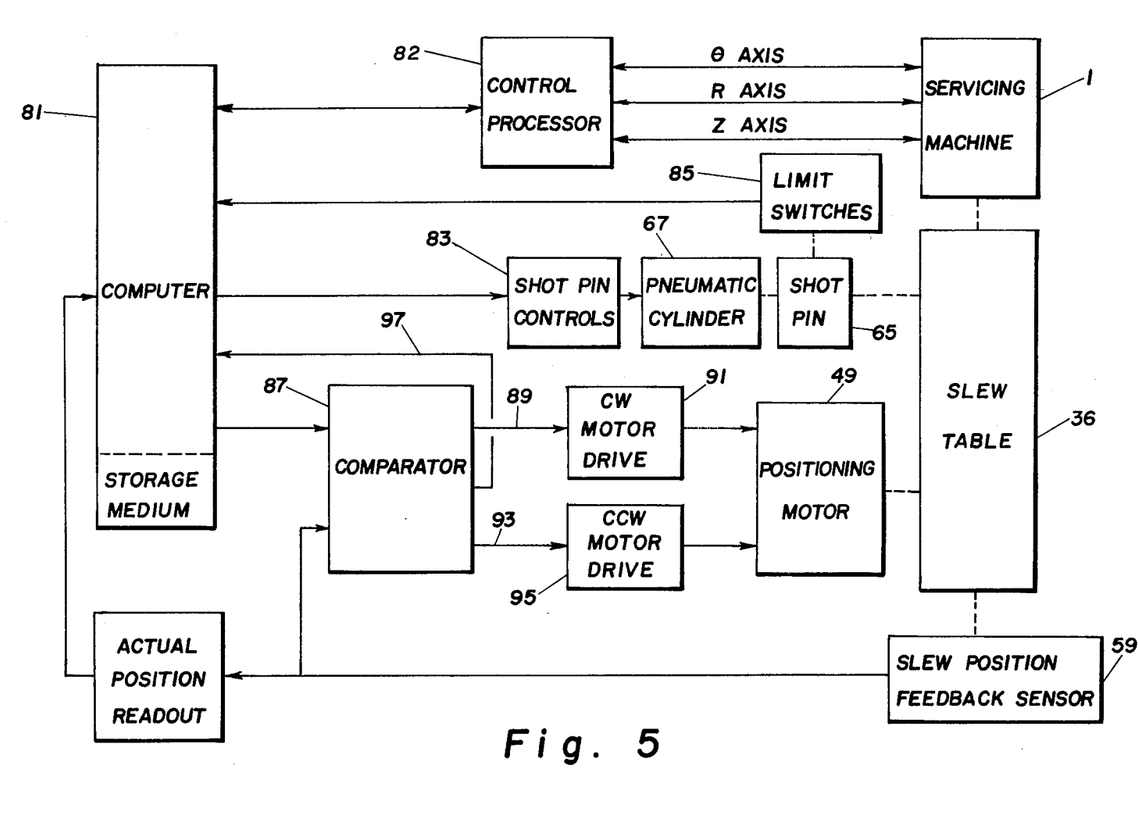
FIG. 5 is a block diagram which schematically illustrates the portion of the control system which incorporates the invention.

FIG. 5 schematically illustrates in block diagram form the portion of the control system applicable to the invention. A full description of the control system for the servicing machine is disclosed in the above mentioned copending application Ser. No. 952,431. As described therein, the computer 81 sends command signals to the control processor 82 which in turn controls the servicing machine 1 by adjusting the angular position of the arm 23 (the θ axis), the longitudinal position of the carriage 27 along the arm 23 (the R axis) and the height of the platform 29 above the carriage 27 (the Z axis).

When it is determined by the computer 81 in the manner discussed below that a change in the angular position of the slew table 36 is required, a signal is sent by the computer to the shot pin control 83 which operates the pneumatic cylinder 67 to retract the shot pin 65, thereby freeing the slew table 36 for rotation. Full retraction of the shot pin 65 is reported back to the computer 81 by the switch 79 (FIG. 2) which is one of the limit switches 85. The computer then sends a command slew position signal representative of the desired angular position of the slew table to the comparator 87. This command slew position signal may be derived by the computer 81 from a storage medium as discussed below. The comparator 87 compares the command slew position signal with a signal generated by the slew position feedback sensor 59 representative of the actual position of the slew table 36. If the difference between the command slew position signal and the actual position signal is such as to require clockwise rotation of the slew plate 35, the comparator 87 generates a signal on line 89 which energizes clockwise motor drive circuit 91 to drive the slew motor 49 and hence the slew plate 35 in a clockwise direction. Similarly, in response to a counterclockwise signal from the comparator 87 on line 93, counterclockwise motor drive circuit 93 energizes the positioning motor 49 to drive the slew table 36 in a clockwise direction.

When the slew position error is reduced to zero, the indication that the slew table 36 has been slewed to the position commanded by the computer is relayed back to the computer 81 over line 97. The computer 81 then sends a signal to the shot pin control 83 which actuates the pneumatic cylinder 67 to seat the shot pin 65 and thereby lock the slew table in the new position. The computer 81 is notified of the seating of the shot pin 65 by the closing of switch 77 which is one of the limit switches 85. With the table locked in position, the computer 81 moves on to the next operation. As illustrated in FIG. 5, the signal from the slew position feedback sensor 59 may be applied to an actual position indicator 99 which provides the operator with a visual indication of the actual angular position of the slew table. The actual position indication may also be fed back to the computer 81 as shown.

Figure 6:
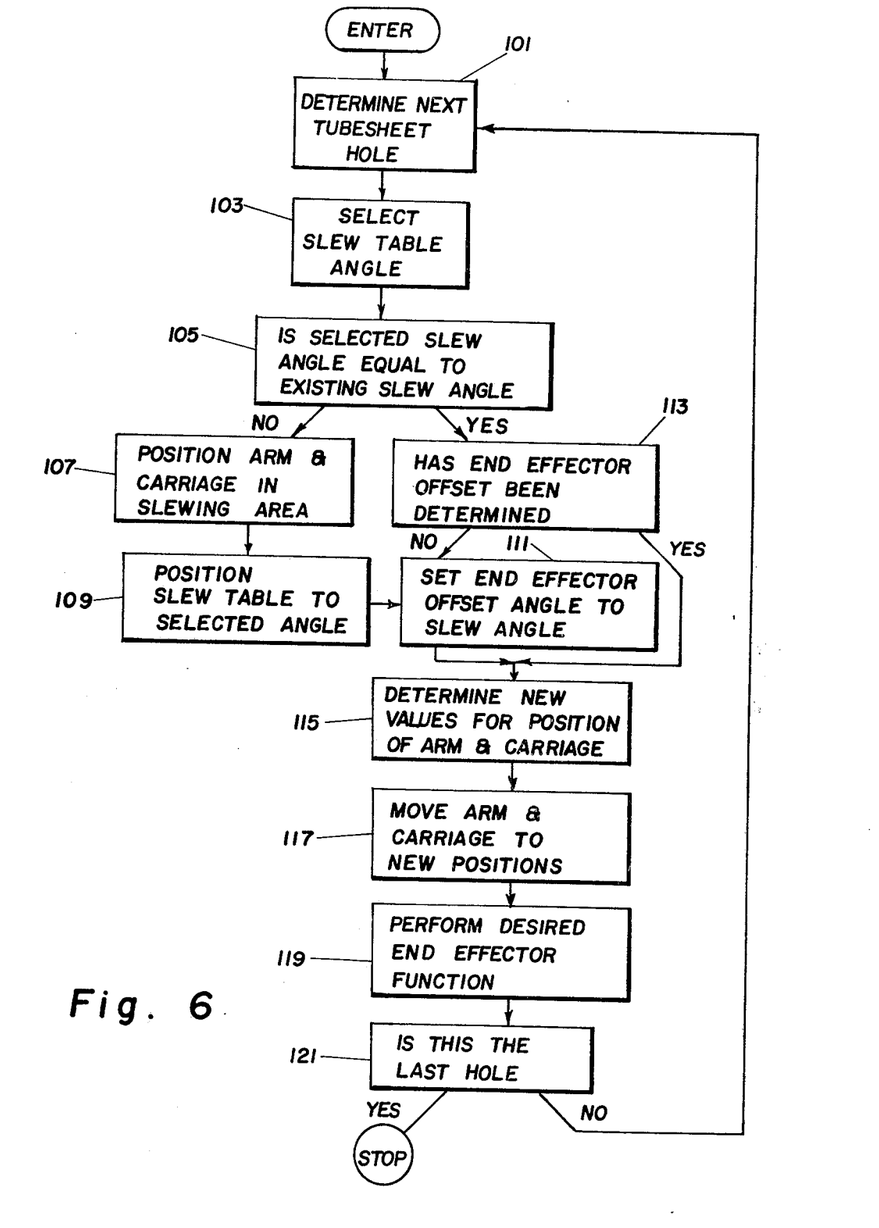
FIGS. 6 through 8 are flow charts schematically illustrating the steps performed by the system in carrying out the invention.

FIG. 6 schematically illustrates operation of the system in accordance with one embodiment of the invention. After determining in block 101 the hole at which a desired operation is to be performed, the angle at which the slew table is to be set is detected in block 103. The manner in which the slew angle is selected will be discussed below. If the selected slew angle is different from the existing slew angle as determined in block 105, the arm 23 and carriage 27 are positioned to a slewing area as in block 107 where the slew table 36 can be rotated to the selected angular position without interference with components in the channel head of the generator. For simplicity, the axis of the slew table may be positioned in the middle of the array under row 25 between column 57 and 58 at the point labeled A in FIG. 4 where the slew table can be rotated to any desired angle. In this manner, only one turning area is required whatever change in the slew angle is required. With the slew table positioned in the turning area, the table is rotated to the selected angle in the manner discussed below, as indicated by block 109. As the table is being slewed, the offset of the tool created by the new slew angle is determined in block 111.

If the selected slew angle is equal to the existing slew angle as determined in block 105, a determination is made in block 113 whether the end effector or tool offset has been determined. Normally, where the slew angle remains the same, this would only have to be determined as in block 111 when the end effector was changed.

In any event, following determination of the proper end effector offset and regardless of whether the slew angle is changed or not, the position of the arm 23 and of the carriage 27 required to place the end effector under the selected hole taking into account the end effector offset are determined in block 115. The arm and carriage are then driven to those required positions as in block 117 and the desired end effector function is performed as in block 119. If this is the last hole on which the function is to be performed as determined in block 121, the procedure is completed. If not, the next hole is selected as in block 101 and the sequence is repeated until the desired end effector function has been performed at each of the designated holes in the array.

One method of selecting the slew table angle as indicated in block 103 of FIG. 6 is to determine a preferred slew angle for each hole in the array and to store this information in a look-up-table in a storage medium such as a magnetic tape storage unit associated with the computer. A suitable selection of slew table angles for the hole array shown in FIG. 4 is indicated by the angles superimposed on various regions of the array. Positive slew table angles on FIG. 4 indicate clockwise rotation of the table from a reference line extending from the pivot axis 19 outward through the center of the T-shaped area 75 and negative angles indicate counterclockwise rotation from this reference line. By using this selection of slew table angles, all of the holes in the array can be reached without changing the length of the slew table support arm.

Figures 7, 8:
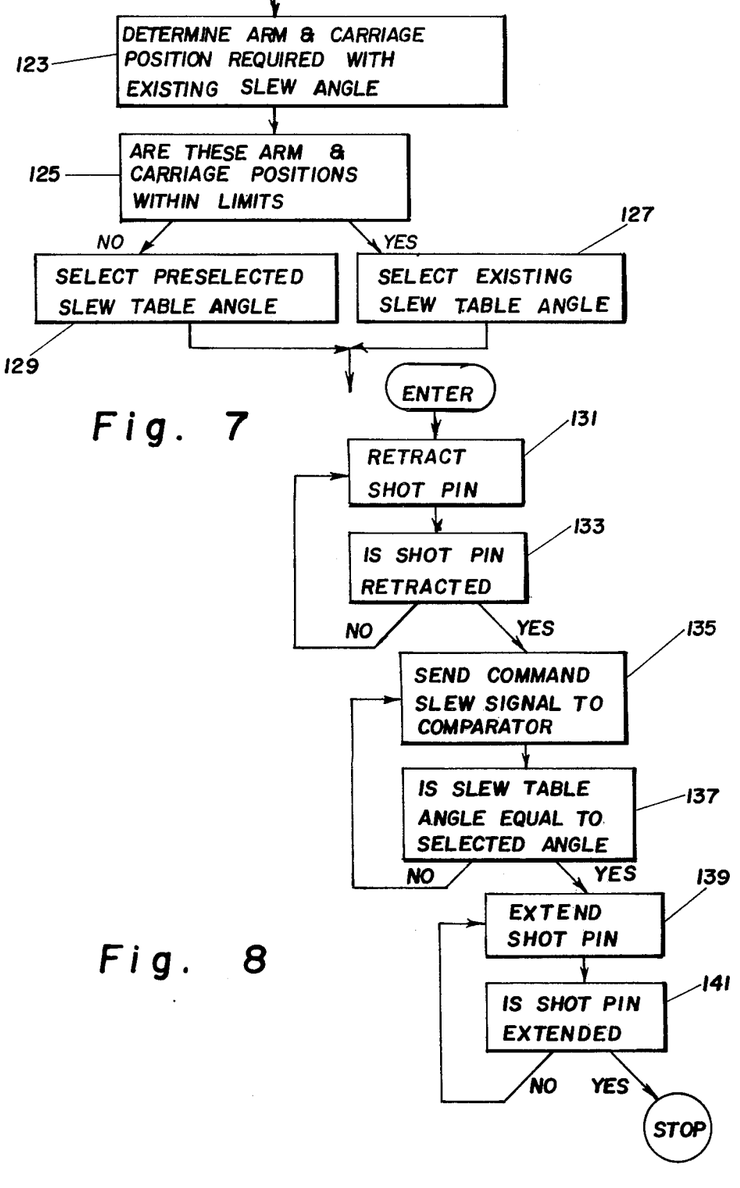

Another method of selecting the slew angle is illustrated schematically in the flow chart of FIG. 7 which may replace block 103 of FIG. 6. According to this method, a determination is made in block 123 of the position required for the arm 23 and carriage 27 to place the end effector under the newly selected hole in the array using the existing slew table angle. If these positions are within the respective limits of travel for the arm and carriage as determined in block 125, the existing auto slew angle is selected for the slew table in block 127. However, if either the position determined in block 123 for the arm or the carriage is not within established limits, a preselected angle such as the angle in a look-up-table as discussed above, is selected in block 129. Accordingly, a change in the slew table angle is only made using this method if required.

The flow diagram of FIG. 8 illustrates schematically the method by which the computer controls the change of the slew angle, which was indicated generally in block 109 of FIG. 6. When a determination has been made to change the slew angle, the shot pin is retracted as indicated in block 131 of FIG. 8. Retraction of the shot pin was described in detail in connection with the description of FIG. 5 above. When the pin is retracted as indicated by the limit switch 79 (FIG. 2), the computer 81 sends the command slew signal to the comparator 87 (FIG. 5) as represented by block 135. When the slew table angle is equal to the selected angle, block 137, as reported by the comparator zero error signal on line 97 (FIG. 5), the shot pin is extended as in block 139 and when the shot pin is fully extended, block 141, as confirmed by the limit switch 77 (FIG. 2), the procedure is completed.

While the invention has been disclosed in what is conceived to be a practical and effective embodiment, it is recognized that departures may be made therefrom which are fully within the spirit of the invention. Accordingly, the invention is not to be limited to the details specifically disclosed but is to be accorded the full scope of the appended claims including any and all equivalents.

I claim:

1. A method of servicing a steam generator tubesheet with an end effector mounted on the free end of a rotatable slew table cantilevered from a carriage movable along a rotatable arm which rotates in a plane parallel to the tubesheet where the end effector cannot be positioned under all the holes solely by adjusting the positions of said rotatable arm and said carriage on said rotatable arm, said method comprising the steps of:

determining the angle that said cantilevered slew table must make relative to the carriage in order for said end effector to be positioned under a selected hole in the tubesheet;

driving the rotatable arm and the carriage on the arm to a slewing area where said cantilevered slew table can be rotated without interference to said determined angle relative to the carriage;

slewing the cantilevered slew table to said determined angular position; and driving the rotatable arm and the carriage to the angular and longitudinal positions respectively that place the end effector under the selected hole taking into account the offset of the slew table.

2. The method of claim 1 wherein prior to slewing the cantilevered slew table, said rotatable arm and carriage are driven to a slewing area at which said platform can be slewed to all possible angular positions thereof without interference.

3. The method of claim 1 wherein the step of determining the angle that said cantilevered slew table must make relative to said carriage comprises retrieving from a storage medium the angle preselected for the selected hole.

4. The method of claim 1 wherein the step of determining the angle that said cantilevered slew table must make relative to the carriage comprises determining the angular position of the rotatable arm and the longitudinal position of the carriage along the rotatable arm required to locate the end effector carried by the slew table under the selected hole with the cantilevered slew table set at the existing angular position, comparing said determined positions of the rotatable arm and the carriage with predetermined limits therefor, selecting the existing angle of said cantilevered slew table as said selected angle when said determined positions of the rotatable arm and the carriage are within said predetermined limits, and selecting another angle for said cantilevered slew table when the determined positions of the arm and carriage are not within said limits.

5. The method of claim 4 wherein said step of selecting another angle comprises retrieving from a storage medium a preselected angle for said cantilevered slew table.

6. A method of servicing a steam generator tubesheet with an end effector mounted on the free end of a rotatable slew table cantilevered from a carriage movable along a rotatable arm which rotates in a plane parallel to the tubesheet where the end effector cannot be positioned under all the holes solely by adjusting the positions of said rotatable arm and said carriage on said rotatable arm, said method comprising the steps of:

determining the angular position of the rotatable arm and the longitudinal position of the carriage along the arm required to locate the end effector carried by the slew table under a selected hole with the cantilevered slew table set at its existing angular position, comparing said determined positions of the rotatable arm and the carriage with predetermined limits therefor, selecting the existing angular position of the cantilevered slew table when the determined positions of the rotatable arm and the carriage are within said limits, selecting another angular position of the cantilevered slew table and slewing said slew table to said another angular position when said determined position of the rotatable arm and the carriage are not within said limits, and driving the rotatable arm and the carriage to the angular and longitudinal positions respectively that place the end effector under the selected hole taking into account the offset of the cantilevered slew table.

7. The method of claim 6 including prior to the step of slewing the cantilevered slew table, the additional step of driving the rotatable arm and the carriage to a slewing area where the cantilevered slew table can be slewed to the selected position without interference.

8. The method of claim 6 wherein the step of selecting another angular position for said cantilevered slew table includes retrieving a preselected angle for the slew table from a storage medium.

* * * * *